Nov. 24, 1953    V. SERRA    2,660,088
APPARATUS FOR CONTINUOUS CINEMATOGRAPHIC PROJECTION
Filed Jan. 24, 1950    2 Sheets-Sheet 1
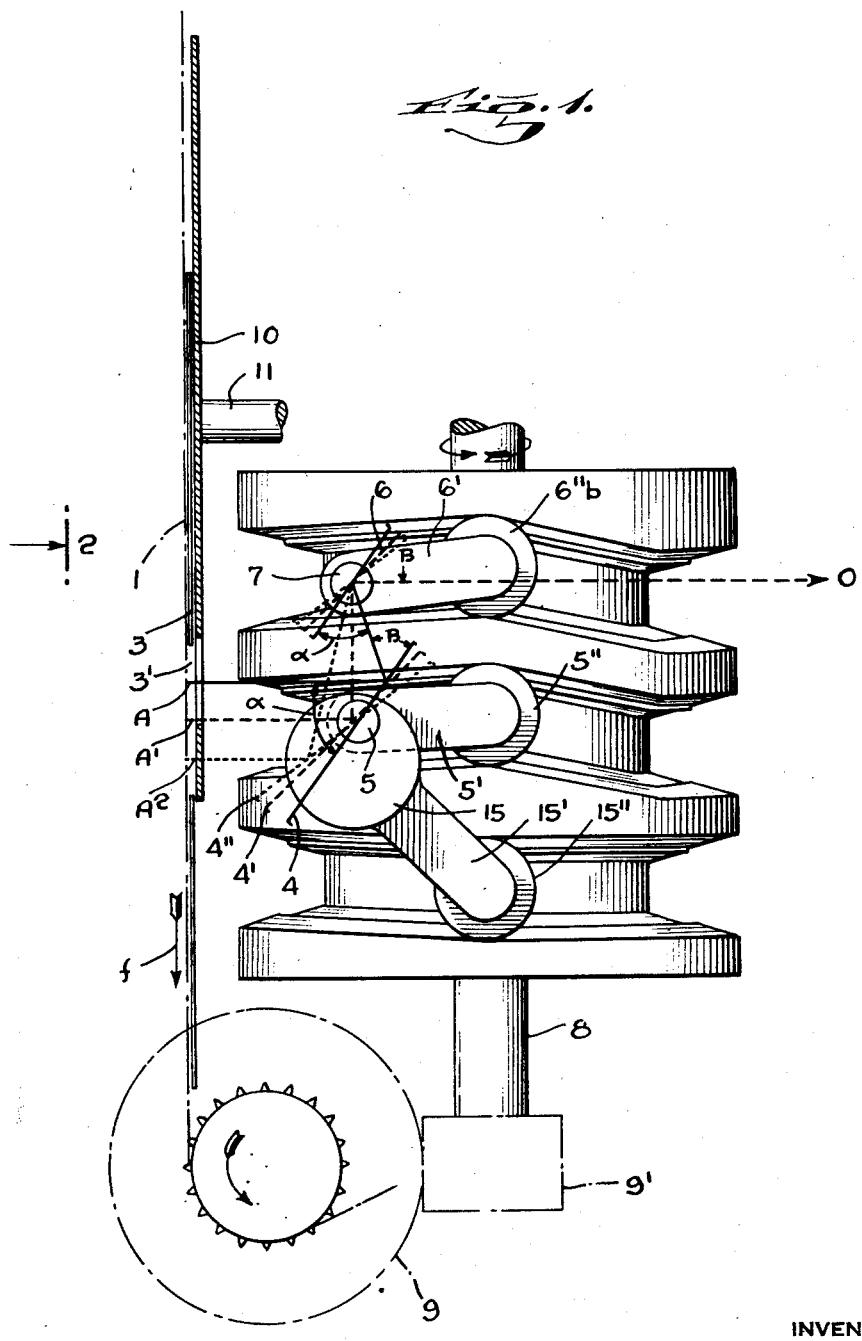
INVENTOR
VINTO SERRA
BY
ATTORNEY

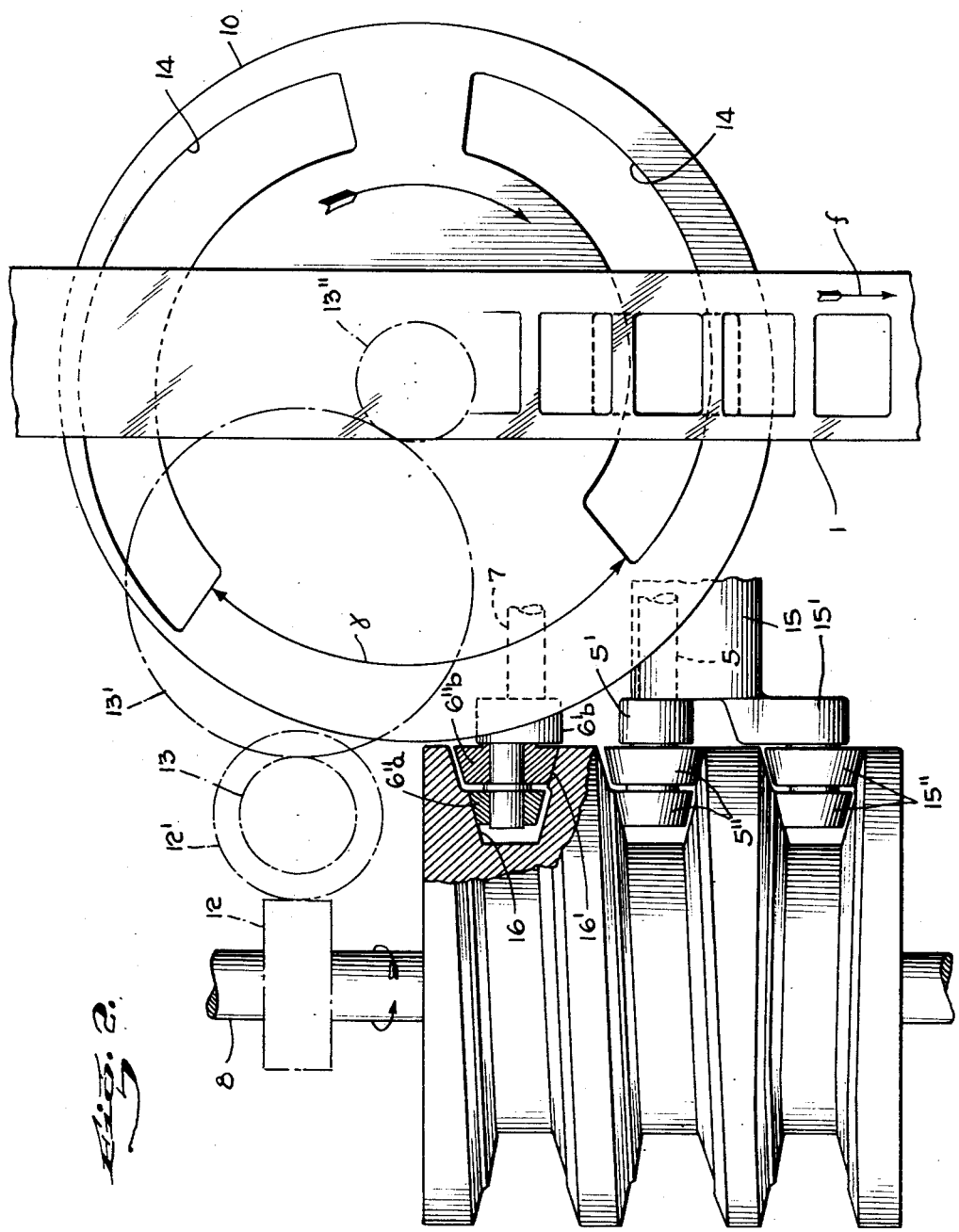

Patented Nov. 24, 1953

2,660,088

UNITED STATES PATENT OFFICE 2,660,088

APPARATUS FOR CONTINUOUS CINEMATOGRAPHIC PROJECTION

Vinto Serra, Milan, Italy

Application January 24, 1950, Serial No. 140,195

Claims priority, application Italy
December 23, 1949

1 Claim. (Cl. 88—16.8)

This invention relates to an apparatus for continuous cinematographic taking and projection.

The taking and projection apparatuses generally used are essentially of the type involving an intermittent movement of the film, which is accomplished by means of a known transporting device usually known as the Maltese cross.

A great deal of work has been done on the realisation of taking and projection apparatuses in which the film moves continuously, based on the principle of optical compensation, but no practical results were obtained.

The advantages of a cinematographic projector with continuous movement of the film are especially noticeable on the lasting of the film which is no more subject to the strains caused by the intermittent movement transporting mechanism and to the pression of the slippers, by means of which the film is caused to adhere to the gate of the projector while the image is stationary.

Further advantages consist in the elimination of the noise due to the intermittent feeding movement, in the reduction of the danger of fire during the projection, as the film is never stationary in front of the light and in the reduction of the wear and tear effects on the transporting members of the film.

In the apparatuses until now proposed said advantages were not however such as to compensate for the constructive complications they were faced with and the remarkably higher cost of the apparatus.

The cinematographic taking and projection apparatus forming object of this invention, fully solves the problem of the realisation of an apparatus in which the film moves through the gate continuously and which offers then all the above mentioned advantages, and the simple construction of which permits a lower cost of the apparatus, which is even lower than that of the usual intermittent movement apparatuses.

Said apparatus is essentially characterized by a pair of mirrors opposed to each other rotating in parallel relationship between two end positions, around axes at right angle to the direction of the optical axis, in such a way as to receive on one mirror the image of a single picture, follow it in synchronism during its passage through a window of at least double height than that of the said picture and project it back by means of the second mirror in a fixed direction corresponding to the axis of the objective, all this during the oscillating movement in one direction of the mirrors.

The oscillating movement in the opposite direction is accomplished through a quick return movement during the passage before the film, of a shutter-like part in a rotatably mounted diaphragm provided with a spiral window of width similar to the height of the picture, which accompanies the picture to be projected during its movement through the gate so as to normally darken the picture adjacent to the picture which is to be projected, during said passage.

The oscillating movement of the mirrors around fixed axes would involve a periodic variation of the focal distance and that would damage the good realisation of the projection. The invention provides then also means for automatically keeping constant the focal distance between the two mirrors during their oscillating movement, said means permitting to vary the mutual distance between the oscillation axes of the two mirrors after the varying of their inclination.

The above and other features of the present invention will be now fully understood from the following description when read in connection with the accompanying drawings which diagrammatically illustrate in exemplifying and not restrictive way one embodiment of the invention, and wherein:

Fig. 1 is an elevation view of the essential parts of the apparatus at right angles to the plane of the film, and Fig. 2 is an elevation view similar to Fig. 1, at 90° with it.

In the apparatus according to the present invention, the film 1 which is to be projected, is fed in the direction of the arrow $f$ by means of a transporting mechanism of any known type, through the window 3' of the gate 3, which is at least twice higher than the picture in the advancing sense of the film. In front to said window is placed a mirror 4, which forms with the plane of said window a medium angle of 45° and is oscillately mounted by means of a pivot 5, which projects back the image of the picture to a mirror 6, placed in parallel relationship with the first one and oscillately mounted by means of a pivot 7, which projects the image in the direction 0 of the objective.

It is clear that upon starting an oscillatory movement of the two mirrors on their pivots (clockwise as shown in Fig. 1) synchronized with the advancing velocity of the film 1, the image of a point A of the picture which continuously moves to points A1 and A2, will be received by the mirror 4 respectively in the position 4, 4', 4" of the mirror, by varying from a position to the other one the incidence angle $a$ of the light beam and similarly the reflection angle β which is alike to α. It will be seen that all can be so disposed as to let the image of point A during its movement through the window 3' be continuously reflected in one fixed point of the mirror 6, the inclination of which is so varied as to compensate for the variations of the incidence angle α on said mirror in order to obtain a reflection under an equal angle β, constantly in the direction 0 of the objective.

The desired oscillating movement of the mirrors is obtained by providing their oscillation pivots 5 and respectively 7 with arms 5', 6' the ends of which are provided with crank pins 5", 6" which come into engagement with cam slots of corresponding width, which are part of a group of cams integral with the shaft 8 which in its turn is in cinematic connection, through a coupling 9, 9' with the feeding mechanism of the film. The connection 9, 9' and the cam slots profiles are such as to obtain a slow half-oscillation of the mirrors in one sense during the passage of the picture to be projected and a quick half-oscillation in the opposite sense during the period in which the light is cut off during the passage from a picture to the next one.

Said period of cut off light is obtained by means of a circular shutter 10 laying in a plane parallel to the film plane and rotatably mounted with the support shaft 11, which is in its turn synchronized with the feeding movement of the film by means of the couplings 12, 12' and 13, 13', 13" between the shaft 8 of the cam group and the shaft 11 of the shutter. Said shutter has an opening 14 following a spiral path which, for reasons of construction may be divided into two or more parts, and the pitch of which corresponds to the height of one picture and the width of which is a little larger than the height of one picture. The transmission relation between the shaft 8 and the shaft 11 is so calculated that the shutter 10 completes a whole turn during the passage of a picture and the space between two successive pictures, through the window 3' of the gate 3. Of course the space between two successive pictures will correspond to the angular cutting off light area of the diaphragm.

As illustrated in the first part of the specification, in order to obtain a good projection means should be provided for keeping constant the focal distance; accordingly the support pivot 5 of the mirror 4 instead of being fixed is eccentrically mounted on a bush 15 rotatably mounted in the casing of the apparatus and provided with an arm 15' ending with a crank pin 15", which engages a third cam slot which has the aim of varying the angular position of the bush 15 so as to displace the rotation axis 5 of the mirror 4 in relation to the variations of inclination of the mirrors 4 and 6. Thus the rotation axis of the mirror 4 will move during the oscillation of the mirrors along a circular path having its centre in the axis of the bush.

In order to obtain a perfect working of the apparatus it is necessary the crank pins 5", 6" and 15" to be operated with absolute precision from the corresponding cam slots and therefore to be made adhere to them without danger of sliding. In order to secure said scope the cam slots are preferably of trapezoidal section, as illustrated in Fig. 2, and consequently the crank pins have conical shape, each crank pin being formed by two freely rotatably mounted elements in independent way. We refer in the following description to the crank pin 6" which drives the mirror 6, the remaining crank pins being constructed and operated in similar way. Said crank pin is composed, as it was mentioned above, by two steps 6"a and 6"b each of which is in contact with different areas 16, 16' of the two opposed sides of the corresponding cam slot; said arrangement allows to exactly adjust owing to an axial movement, the crank pin 6" in the corresponding slot, without danger of sliding and consequently without disadvantageous frictions owned to the constructive imperfections of the crank pin.

In an apparatus of this kind it is not obtained a total elimination of the flicker seen on the screen, as in continuous projectors with optical compensation, which had been proposed but never carried out to effect; however owing to the very short duration of the cutting off light period said flicker is reduced to a minimum. On the contrary it is obtained a very satisfactory increase in the yielding of the light, the maximum cutting off light period reaching the 40% whilst in the generally used projectors it is never lower than the 50%. On other hand all the above mentioned advantages which can be found in the continuous projectors with optical compensation are obtained as for what concerns the lasting of the film, of the driving members and the elimination of the noises.

All this is obtained with extreme constructive easiness, which causes the cost of the apparatus to remain lower than that of the intermittent movement projectors. Moreover it is possible to obtain in the taking apparatuses feeding speed greatly superior than the average speed, owing to the fact that the danger of breakage of the film is prevented, thus enlarging the application field of the cinematography for scientific use.

Having thus described the invention, what is claimed as new and desired to be secured by Letters Patent, is:

A cinematographic apparatus, comprising in combination: actuating means for continuously advancing a film, a pair of oscillatable parallel mirrors arranged in the path of light rays between said film and an objective for throwing an image from one to the other, oscillating means operatively connected with said actuating means and engaged with said parallel mirrors for oscillating same in timed relationship to the advancing of the film, said oscillating means including rotatable cam means coupled with said actuating means for rotation in synchronism with the advancing of the film, said cam means having a pair of slots, a pair of cam followers operatively engaged with said pair of slots, a pair of crank arms, one end of each crank arm carrying one of said cam followers, and a pair of rotatable pins, each pin being connected with the other end of one of said crank arms and being fixed to one of said mirrors in coaxial alignment with the axis of oscillation of the latter, and correcting means operatively connected with said actuating means and engaged with at least one of said mirrors for displacing the axis of oscillation of the associated mirror in a predetermined relation to the variations of inclinations of the oscillating mirrors so as to correct continuously the perpendicular distance between said parallel mirrors for maintaining constant the length of the light rays between the film and the objective, said correcting means including at least one rotatable supporting means, the pin fixed to the mirror subject to displacement of its axis of oscillation being rotatably mounted in said supporting means, the axis of said pin being parallel and eccentrical to the axis of rotation of said supporting means, a lever rigid with said supporting means, and a third cam follower mounted on said lever, said rotatable cam means having a third slot, and said third cam follower being operatively engaged with said third slot.

VINTO SERRA.

References Cited in the file of this patent

UNITED STATES PATENTS

| Number | Name | Date |
|---|---|---|
| 1,332,238 | Tomlinson | Mar. 2, 1920 |
| 1,549,750 | Dole | Aug. 18, 1925 |
| 1,642,599 | Bowell | Sept. 13, 1927 |
| 1,906,818 | Seufert | May 2, 1933 |
| 2,154,809 | DeKay | Apr. 18, 1939 |
| 2,227,054 | Bedford | Dec. 31, 1940 |

FOREIGN PATENTS

| Number | Country | Date |
|---|---|---|
| 370,262 | Germany | Mar. 1, 1923 |
| 40,293 | France | Feb. 12, 1932 |
| | (3d Addition of 668,946) | |